US012626613B1

(12) United States Patent
Salla

(10) Patent No.: US 12,626,613 B1
(45) Date of Patent: *May 12, 2026

(54) ROTATIONAL DEVICE

(71) Applicant: Omar Salla, Pembroke Pines, FL (US)

(72) Inventor: Omar Salla, Pembroke Pines, FL (US)

( * ) Notice: Subject to any disclaimer, the term of this patent is extended or adjusted under 35 U.S.C. 154(b) by 669 days.

This patent is subject to a terminal disclaimer.

(21) Appl. No.: 18/088,983

(22) Filed: Dec. 27, 2022

Related U.S. Application Data

(63) Continuation-in-part of application No. 16/787,590, filed on Feb. 11, 2020, now Pat. No. 11,538,361.

(60) Provisional application No. 62/803,904, filed on Feb. 11, 2019.

(51) Int. Cl.
G09B 23/04 (2006.01)

(52) U.S. Cl.
CPC .................................... G09B 23/04 (2013.01)

(58) Field of Classification Search
CPC ........ G09B 23/02; G09B 23/04; G09B 23/06; G09B 23/08; G09B 23/10
See application file for complete search history.

(56) References Cited

U.S. PATENT DOCUMENTS

| | | | | | |
|---|---|---|---|---|---|
| 2,078,729 | A | * | 4/1937 | Lemoine | G09B 23/10 446/233 |
| 3,327,801 | A | * | 6/1967 | Ezra | B60B 19/14 180/21 |

| | | | | | |
|---|---|---|---|---|---|
| 4,094,091 | A | * | 6/1978 | Kupperman | A63H 33/40 446/176 |
| 4,579,336 | A | * | 4/1986 | Morin | A63B 19/02 441/78 |
| 4,799,667 | A | * | 1/1989 | Suchy | A63B 19/04 472/17 |
| 5,982,374 | A | * | 11/1999 | Wahl | G06T 17/00 715/848 |
| 6,491,563 | B1 | * | 12/2002 | Bailey | A63H 33/062 446/120 |
| 6,976,899 | B1 | * | 12/2005 | Tamanas | B62D 57/04 446/454 |
| 7,694,463 | B2 | * | 4/2010 | Lanahan | E04B 1/3211 52/81.3 |
| D646,735 | S | * | 10/2011 | Nichols | D21/713 |
| 8,528,854 | B2 | * | 9/2013 | Yan | A63H 33/005 244/119 |

(Continued)

*Primary Examiner* — Kurt Fernstrom

(74) *Attorney, Agent, or Firm* — John Rizvi; John Rizvi, P.A.—The Patent Professor®

(57) ABSTRACT

A rotational device is provided that enables a user to tangibly experience movement of a three-dimensional object in a four dimensional space. The rotational device includes an inner cubic frame assembly rotatably supported within an outer frame. The outer frame is formed from a series of wires connected at hubs to enable the user to view the movement of the inner cubic frame. An internal cubic frame is non-movably or rotatably mounted within the outer frame to support the inner cubic frame assembly. The inner cubic frame assembly includes an inner cubic frame and a sphere. The sphere may be non-movably or rotatably supported within the inner cubic frame. Reference points or nodes are provided on the inner cubic frame to provide visually traceable reference points as the inner cubic frame rotates within the outer frame and fixed internal cubic frame.

20 Claims, 13 Drawing Sheets

(56)                    References Cited

U.S. PATENT DOCUMENTS

| | | | |
|---|---|---|---|
| 8,636,521 B2 * | 1/2014 | Pacheco | G09B 23/10 |
| | | | 74/25 |
| 9,061,558 B2 * | 6/2015 | Kalantari | A63H 33/005 |
| 9,421,452 B2 * | 8/2016 | Carlow | G09B 1/00 |
| 9,611,032 B2 * | 4/2017 | Briod | B64U 10/13 |
| 9,725,170 B2 * | 8/2017 | Daler | B64C 17/00 |
| 11,287,092 B1 * | 3/2022 | Pertsch | F21V 7/0008 |
| D993,326 S * | 7/2023 | Xiao | D21/460 |
| 2010/0068967 A1 * | 3/2010 | Hume | A63F 9/0873 |
| | | | 446/236 |

* cited by examiner

ROTATIONAL DEVICE

CROSS-REFERENCE TO RELATED APPLICATION

This application is a Continuation-in-Part of U.S. patent application Ser. No. 16/787,590, filed on Feb. 11, 2020, which in turn claims the benefit of U.S. Provisional Patent Application No. 62/803,904, filed on Feb. 11, 2019, which are incorporated by reference herein in their entirety.

FIELD OF THE INVENTION

The present invention relates generally to educational and/or demonstration devices, and more particularly, to a device to allow a user to tangibly experience movement of a three-dimensional object in four dimensions.

BACKGROUND OF THE INVENTION

It is important when teaching or demonstrating new material that the student or subject fully grasp and understand the details of the topic being demonstrated or taught. For example, while most people can understand the concept of three dimensions, the concept of four dimensions is often difficult to grasp. Three-dimensional objects are present everywhere in people's daily lives and the concepts pertaining to three dimensions are easily displayed and understood by the average person. However, when a fourth dimension is introduced, in the form of the relationship of two three-dimensional objects, and the varying shapes of the space(s) between them over time, people often have a difficult time understanding or visualizing the concept of this additional dimension as it relates to three-dimensional objects and how they interact in pairs.

The tesseract is known, and consists in a four-dimensional analogue of the cube that attempts to depict the movement and change of the spaces between two three-dimensional objects over time. The concept of a cubic tesseract sphere is also known and is illustrated in books and in videos. Computer animations of the movements associated with cubic tesseract sphere are also available and attempt to provide visual depictions of the movement of a three-dimensional object in a four dimensional space. These depictions show how one three-dimensional object is positioned over time relative to another three-dimensional object or reference frame.

However, these attempts to convey the concepts of one three-dimensional object moving relative to another three-dimensional object and, more particularly the movement of the shapes occupied in the spaces between them, are still only displayed in two dimensions on a page or on a screen.

Accordingly, there is an established need for a practical device to physically and tangibly demonstrate the motion of three-dimensional objects relative to each other over time including the variations in the shapes and orientations of spaces defined between each of the three-dimensional objects.

SUMMARY OF THE INVENTION

The present invention is directed to a novel and useful rotational device similar to a cubic tesseract sphere that enables a user to tangibly experience movement of a three-dimensional object in a four dimensional space. The disclosed rotational device provides an actual three-dimensional experience in real time greatly increasing a user understanding of movement of a three-dimensional object relative to a fixed point or points of reference over a period of time than is possible with a simple visual depiction or animation. The rotational device may include an inner cubic frame assembly, which may be rotatably supported within an outer frame. The outer frame may be formed from a series of wires to enable the user to view the movement of the inner cubic frame. A rotation mechanism may be provided to allow a user to rotate the inner cubic frame within the outer frame. The disclosed rotational device can be used by people of all ages to better understand how time, space and matter work in pairs. This may find application by extension to the development of religions, the operation of plant and animal cells, atoms or molecules, male female interactions over time, etc. and may be provided as a science tool, a toy, etc.

Introducing a first embodiment of the invention, the present invention consists of a rotational device for tangibly experiencing movement of a three-dimensional object in four dimensions, comprising:

an outer frame comprising a plurality of wires forming a three-dimensional structure defining an interior of the outer frame, wherein the wires are arranged in spaced-apart configuration with one another enabling visibility of the interior of the outer frame from outside the outer frame; and an inner cubic frame assembly movably mounted for rotation within the interior of the outer frame, wherein the inner cubic frame assembly is visible from outside the outer frame.

In a second aspect, the inner cubic frame assembly may be rotatably supported by two points of the outer frame, the two points defining a rotation axis of the inner cubic frame assembly.

In another aspect, the inner cubic frame assembly may be rotatably coupled to, and carried by, the outer frame at the two points.

In another aspect, the outer frame may further include a plurality of hubs. The wires may connect to and extend from the plurality of hubs.

In another aspect, an outer side of the outer frame defined by outer sides of the plurality of wires may be shaped as a sphere.

In another aspect, the plurality of wires may include a first wire subset including one or more wires arranged forming a first great circle on a first plane.

In another aspect, the plurality of wires may include a second wire subset comprising one or more wires arranged forming a second great circle on a second plane, wherein the first and second planes form an angle other than 90 degrees with each other.

In another aspect, the plurality of wires may include a second wire subset comprising one or more wires arranged forming a second great circle on a second plane, wherein the first and second planes are perpendicular to each other.

In another aspect, the plurality of wires may include a third wire subset comprising one or more wires arranged forming a third great circle on a third plane. The first, second and third planes may be perpendicular to each other.

In another aspect, the plurality of wires may extend along a plurality of great circles of the sphere.

In another aspect, the rotational device may further include a fixed internal cubic frame fixedly attached to and arranged inward of the outer frame. The fixed internal cubic frame may rotatably support the inner cubic frame assembly.

In another aspect, the outer frame may be formed of first and second frame halves.

In another aspect, the first and second frame halves may be disconnectably mountable to one another.

In another aspect, the fixed internal cubic frame may include a first series of legs carried by the first frame half and a second series of legs carried by the second frame half. The first and second series of legs may be configured to interconnect and form a cubic shape when the first and second frame halves are mounted to one another to form the outer frame.

In another aspect, the inner cubic frame assembly may include a cubic frame and a sphere mounted within the cubic frame.

In another aspect, the sphere may be rigidly and non-movably connected to the cubic frame.

In another aspect, the sphere may be mounted to the cubic frame such that the sphere is movable relative to the cubic frame.

In another aspect, the rotational device may further include a rotation mechanism extending through the outer frame and engaging the inner cubic frame assembly such that rotation of the rotation mechanism rotates the inner cubic frame assembly within the outer frame. The rotation mechanism may include a user-operable section arranged outside the outer frame and manually operable to cause rotation of the rotation mechanism.

In another implementation of the invention, a rotational device may include an outer frame, a first internal cubic frame, a second internal cubic frame, and an inner sphere. The first internal cubic frame may be attached to the outer frame and arranged within an interior of the outer frame. The second internal cubic frame may be rotatably attached to the first internal cubic frame and arranged within an interior of the first internal cubic frame. The inner sphere may be attached to the second internal cubic frame and arranged within an interior of the second internal cubic frame.

In a second aspect, the first internal cubic frame may be visible from outside the outer frame through the outer frame.

In another aspect, the second internal cubic frame may be visible from outside the outer frame through the first internal cubic frame and outer frame.

In another aspect, the inner sphere may be visible from outside the outer frame through the second internal cubic frame, first internal cubic frame and outer frame.

In another aspect, the outer frame may include a plurality of wires forming a three-dimensional structure defining the interior of the outer frame.

In yet another aspect, an outer side of the outer frame defined by outer sides of the plurality of wires may be shaped as a sphere.

In another aspect, the interior of the outer frame, the first and second internal cubic frames, and the inner sphere may be visible from outside the outer frame and between the plurality of wires.

In another aspect, the first and second internal cubic frames, and the inner sphere may be visible from outside the outer frame through spaces defined between the plurality of wires.

In another aspect, the first internal cubic frame may be rigidly and non-movably connected to the outer frame.

In yet another aspect, the first internal cubic frame may be mounted to the outer frame such that the first internal cubic frame is rotatable relative to the outer frame.

In another aspect, the first internal cubic frame may be rotatably supported by two points of the outer frame, the two points defining a rotation axis of the first internal cubic frame with respect to the outer frame.

In another aspect, the first internal cubic frame may be rotatably coupled to, and carried by, the outer frame at the two points.

In another aspect, the second internal cubic frame may be rotatably supported by two points of the first internal cubic frame, the two points defining a rotation axis of the second internal cubic frame with respect to the first internal cubic frame.

In yet another aspect, the second internal cubic frame may be rotatably coupled to, and carried by, the first internal cubic frame at the two points.

In another aspect, the inner sphere may be rigidly and non-movably connected to the second internal cubic frame.

In another aspect, the sphere may be mounted to the second internal cubic frame such that the sphere is rotatable relative to the second internal cubic frame.

In another aspect, the inner sphere may be rotatably supported by two points of the second internal cubic frame, the two points defining a rotation axis of the inner sphere with respect to the second internal cubic frame.

In yet another aspect, the inner sphere may be rotatably coupled to, and carried by, the second internal cubic frame at the two points.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a rotational device that is capable of representing the movement of a three-dimensional object within a four dimensional space. The invention can be used for educational purposes, for instance and without limitation.

Figure 1:
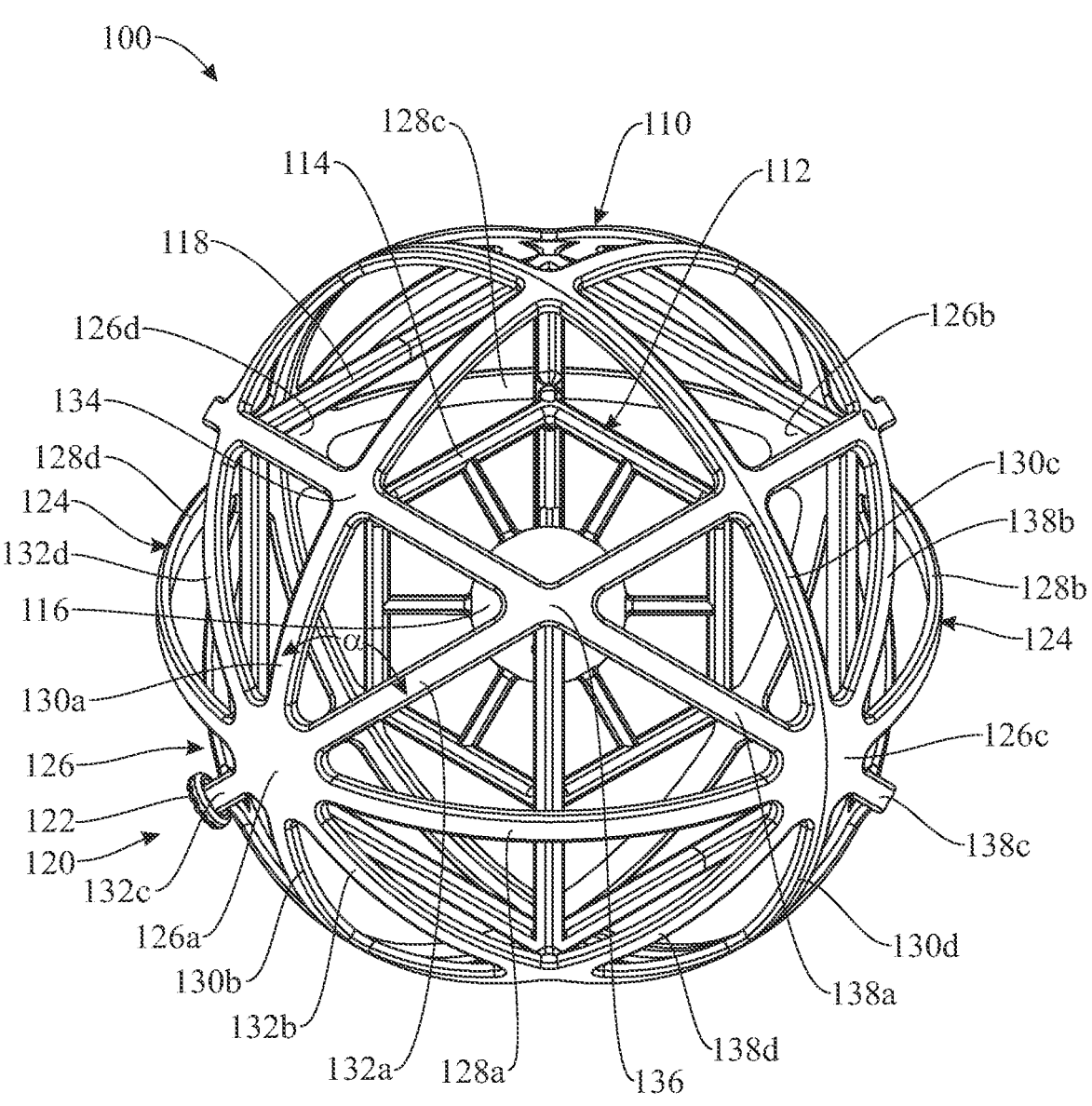
FIG. 1 presents a front view of a rotational device in accordance with an illustrative embodiment of the present invention.
Figure 2:
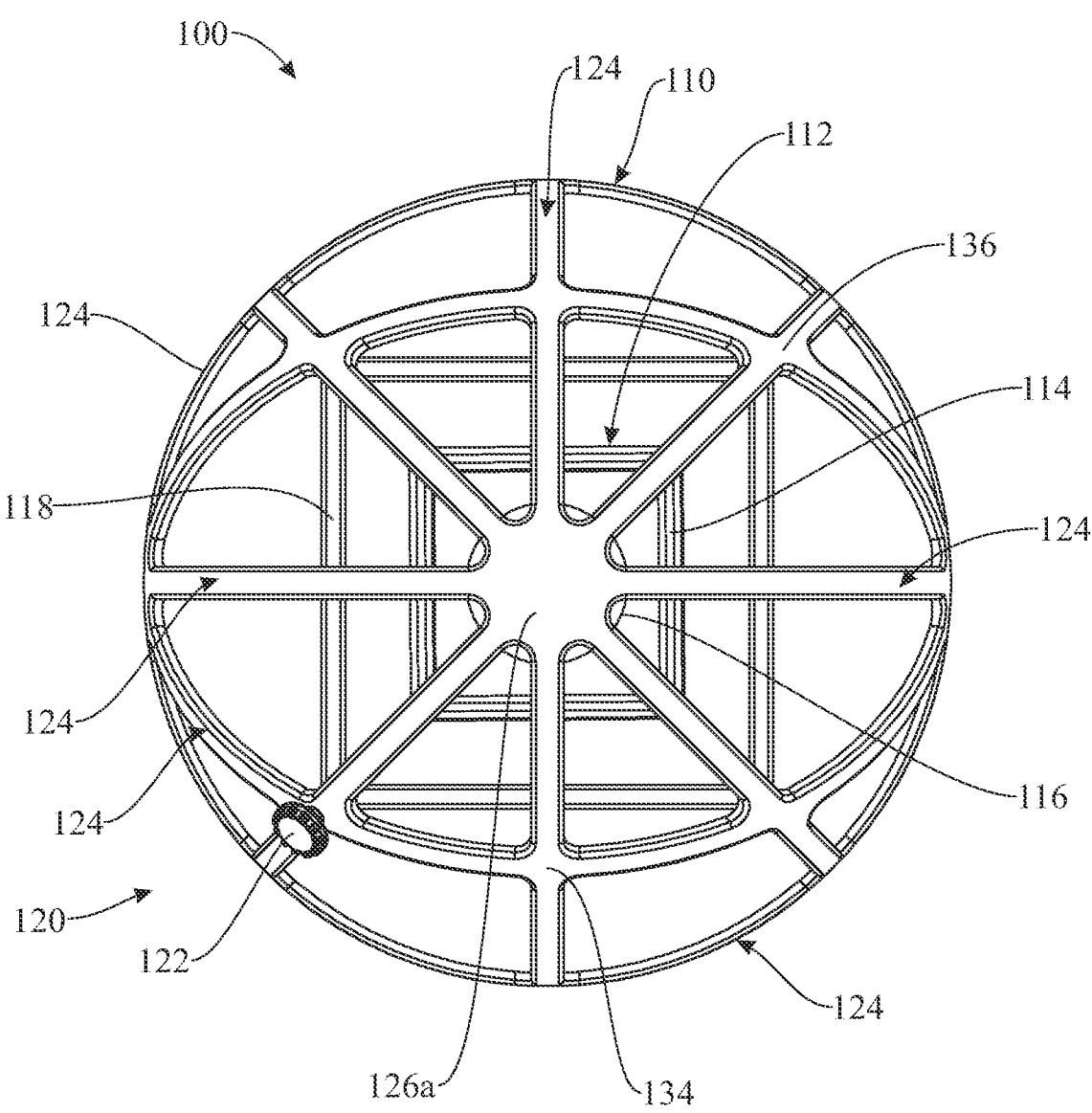
FIG. 2 presents a rear view of the rotational device.
Figure 3:
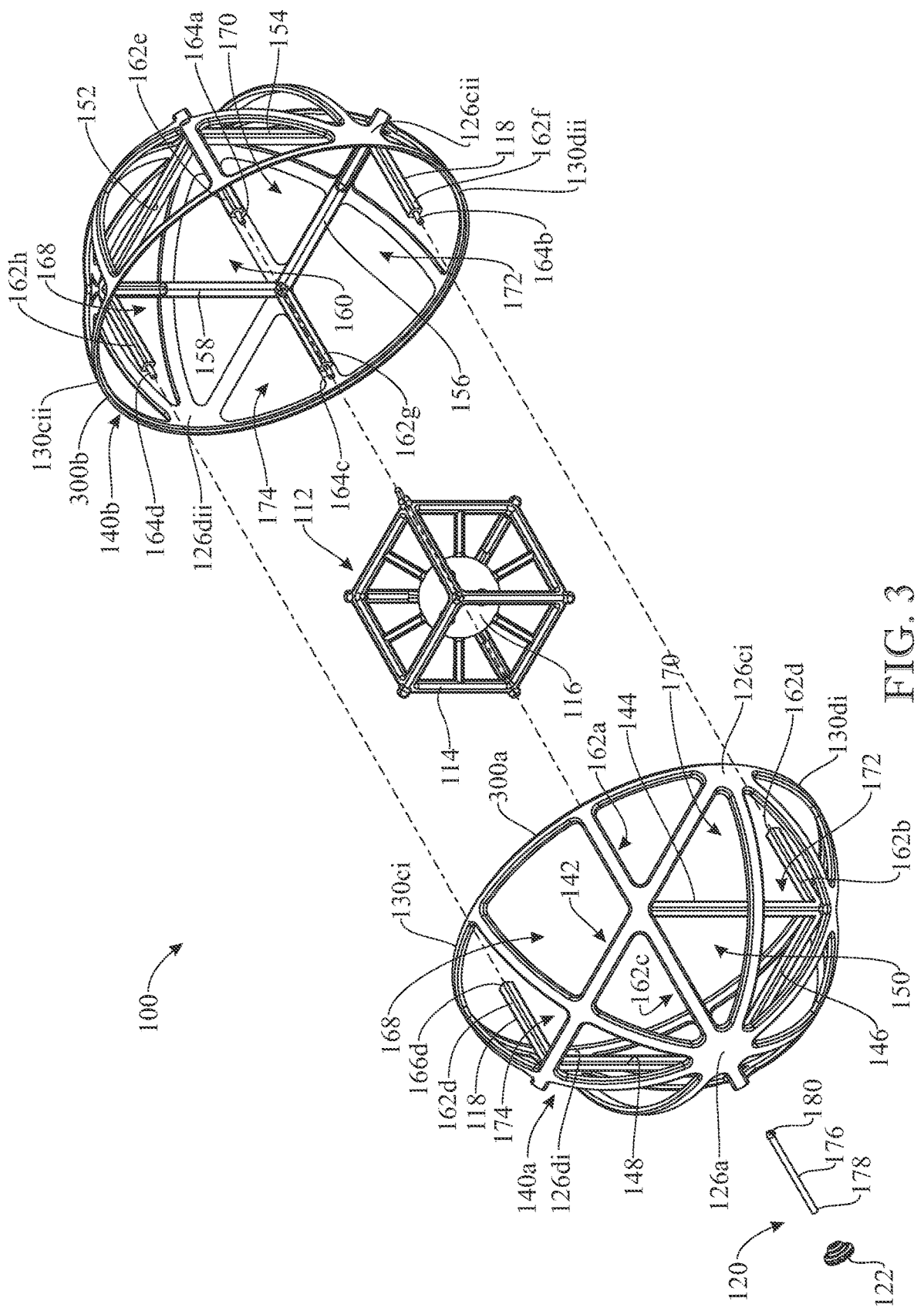
FIG. 3 presents an exploded, isometric view of the rotational device, showing an outer frame partitioned into semi-spheres, an inner cubic frame assembly and a rotation mechanism for rotating the inner cubic frame assembly within the outer frame of the rotational device.

Referring initially to FIGS. 1-3, a rotational device 100 is illustrated in accordance with an exemplary embodiment of the present invention, configured as a manually-rotatable cube within an outer body, which can be spherical in some embodiments of the invention. As shown, the rotational device 100 generally includes an outer frame 110, which can be spherical as shown or present alternative shapes, and an inner cubic frame assembly 112, best shown in FIG. 3, rotatably mounted within the outer frame 110. With continued reference to FIG. 3, the inner cubic frame assembly 112 has a cubic frame 114 and an inner sphere 116, which is fixedly mounted within the cubic frame 114. A fixed internal cubic frame 118 is located within the outer frame 110 and is non-movable relative to the outer frame 110. The fixed internal cubic frame 118 rotatably supports the inner cubic frame assembly 112 within the outer frame 110. A rotation mechanism 120, having a rotatable knob 122, may extend through the outer frame 110 and may be in engagement with the inner cubic frame assembly 112 to rotate the inner cubic frame assembly 112 within the outer frame 110 to demonstrate the movement of a three-dimensional body within a four dimensional space as discussed in more detail hereinbelow.

In accordance with the present disclosure, the inner cubic frame assembly 112 is visible through the outer frame 110 to enable the user to observe the movement of the three-dimensional inner cubic frame assembly 112 within the three-dimensional outer frame 110. For example, as shown in FIG. 1, the outer frame 110 may be formed from a series of arms or wires 124 extending from and between a plurality of hubs 126. In this embodiment, the outer frame 110 is formed with a plurality of hubs 126 specifically comprised of four hubs 126*a*, 126*b*, 126*c* and 126*d*. Hubs 126*a* and 126*b* are located diametrically opposite each other about the outer frame 110 and hubs 126*c* and 126*d* are also located diametrically opposite each other about the outer frame 110.

With specific reference to FIG. 1, each of the hubs 126*a-d* has eight wires 124 extending outwardly therefrom (i.e. from the hub 126*a-d*). The eight wires 124 include four short wires 128*a*, 128*b* 128*c* and 128*d*. Two of the short wires 128*a-d* extend from each of the hubs 126*a-d*. For example, the short wire 128*a* extends between the hubs 126*a* and 126*c*, the short wire 128*b* extends between the hub 126*c* and 126*b*, the short wire 128*c* extends between the hub 126*b* and 126*d*, and the short wire 128*d* extends between the hub 126*d* and 126*a*. The short wires 128*a-d* are coplanar and define a first plane which extends through the outer frame 110. In some embodiments, such as the present embodiments, the coplanar short wires 128*a-d* are arranged along a great circle of the spherical outer frame 110.

The remaining wires 124 which extend from the hubs 126*a-d* are longer than the four short wires 128*a-d*. Specifically, in the present embodiment, four perpendicular wires 130*a*, 130*b*, 130*c* and 130*d* of the wires 124 extend from each hub perpendicular to the four short wires 128*a-d* and the plane defined thereby. For example, the perpendicular wire 130*a* extends between hubs 126*a* and 126*b* and lies along a plane perpendicular to plane formed by the four short wires 128*a-d*. The perpendicular wire 130*b* also extends between the hub 126*a* and 126*b*. Together, the perpendicular wires 130*a* and 130*b* define another great circle of the spherical outer frame 110, arranged on a plane perpendicular to the plane defined by the short wires 128*a-d*. Similarly, the perpendicular wire 130*c* extends between the hub 126*c* and 126*d* while the perpendicular wire 130*d* also extends between the hub 126*c* and the hub 126*d*. Together, the perpendicular wires 130*c* and 130*d* define yet another great circle of the spherical outer frame 110, which defines a plane perpendicular to both the plane defined by the short wires 128*a-d* and the plane defined by the two perpendicular wires 130*a* and 130*b*.

The remaining wires 124 extending from the hubs 126*a-d* include a first set of angled wires 132*a-d* which are also longer than the short wires 128*a-d* and extend from and between the hubs 126*a* and 126*b* at an angle of approximately 45° to the short wires 128*a-d* and to the perpendicular wires 130*a* and 130*b*. More specifically, as shown, the angled wires 132*a* and 132*c* extend in opposite directions from the hub 126*a* to the hub 126*b* forming a great circle arranged at an angle α of 45° from the perpendicular wire 130*a*. In turn, the angled wires 132*b* and 132*d* extend in opposite directions from the hub 126*a* to the hub 126*b* forming a great circle arranged at an angle of 45° from the perpendicular wire 130*a*.

Likewise, a second set of angled wires 138*a-d* which are also longer than the short wires 128*a-d* extend from and between the hubs 126*c* and 126*d* at an angle of approximately 45° to the short wires 128*a-d* and to the perpendicular wires 130*c* and 130*d*. More specifically, as shown, the angled wires 138*a* and 138*c* extend in opposite directions from the hub 126*c* to the hub 126*d* forming a great circle arranged at an angle of 45° from the perpendicular wire 130*c*. In turn, the angled wires 138*b* and 138*d* extend in opposite directions from the hub 126*c* to the hub 126*d* forming a great circle arranged at an angle of 45° from the perpendicular wire 130*c*.

As shown in FIG. 1, the wires 124 intersect along the outer frame 110. The intersections of the wires 124 about the outer frame 110 are formed with different angles, such as a 90° right angle intersection 134 or an angled intersection 136 of an angle other than 90°.

Thus, together, the hubs 126*a-d* and the wires 124 including the short wires 128*a-d*, the perpendicular wires 130*a-d*, the angled wires 132*a-d* and the angled wires 138*a-d* form the spherical shape of the outer frame 110 of the present embodiment and allow the movement of the inner cubic frame assembly 112 to be visible through the outer frame 110. The orientation of the short wires 128*a-d*, the perpendicular wires 130*a-d*, the angled wires 132*a-d* and the angled wires 138*a-d*, and the various planes defined thereby, alone or together, can be used as points, lines, circles, planes, or other reference items to illustrate the motion of the three-dimensional inner cubic frame assembly 112 relative to a fixed coordinate or coordinates through time.

Referring now to FIG. 3, in order to facilitate assembly of the rotational device 100, the perpendicular wires 130*c* and 130*d* along with the hubs 126*c* and 126*d* are split in half to form two semi-spheres or outer frame halves 140*a* and 140*b*. Specifically, perpendicular wire 130*c* is split into wire halves 130*ci* and 130*cii* and perpendicular wire 130*d* is split into wire halves 130*di* and 130*dii*. Similarly, hub 126*c* is split into hub halves 126*ci* and 126*cii* and hub 126*d* is split into hub halves 126*di* and 126*dii*. In order to better align the outer frame halves 140 and 140*b* together to prevent slipping apart, the wire halves 130*ci* and 130*cii* have overlapping and/or interlocking edges 300*a* and 300*b* (see also FIG. 6). Likewise, the wire halves 130*di* and 130*dii* also may have overlapping and/or interlocking edges 302*a* and 302*b* (see also FIG. 6).

As noted hereinabove, the rotational device 100 includes the fixed internal cubic frame 118 which is located within and fixedly attached to the outer frame 110. The fixed internal cubic frame 118 has four legs 142, 144, 146 and 148 which define (i.e. are arranged forming) a first square 150 within the first outer frame half 140*a* and four legs 152, 154, 156 and 158 which define (i.e. are arranged forming) a second square 160 within the second outer frame half 140*b*.

In order to connect the first outer frame half 140*a* to the second outer frame half 140*b*, the remaining legs of the fixed internal cubic frame 118 are split into semi-legs. For example, the first square 150 has four semi-legs 162*a*, 162*b*, 162*c* and 162*d* extending perpendicularly from the first square 150 and the second square 160 has four semi-legs 162*e*, 162*f*, 162*g* and 162*h* extending perpendicularly from the second square 160. Each of the four semi-legs 162*e-h* terminate in pins 164*a-d* while each of the four semi-legs 162*a-d* terminate in corresponding holes 166*a-d* configured to receive the pins 164*a-d*, respectively. The first and second outer frame halves 140*a* and 140*b* may be connected together by various known means such as, for example, friction fit, gluing, welding, etc. For example, the pins 164*a-d* may be inserted into and retaining within the holes 166*a-d*, respectively, in friction fit fashion such that the first and second outer frame halves 140*a* and 140*b* may be taken apart to repair or replace the inner cubic frame assembly 112 with a similar or dissimilar object to express the motion of a different three-dimensional object with respect to the outer frame 110 and/or the fixed internal cubic frame 118 through time. Once connected, the legs 142, 144, 146, 148, 152, 154, 156 and 158 define the remaining four squares 168, 170, 172 and 174, or square sides, which, along with the first and second squares 150 and 160, or square sides, define the cubic shape of the fixed internal cubic frame 118.

Alternatively, where the assembly of the first and second outer frame halves 140*a* and 140*b* is intended to be relatively permanent, the pins 164*a-d* may be glued or otherwise fused within the holes 166*a-d*. Additionally, the perpendicular wire halves 130*ci* and 130*cii* and the perpendicular wire halves 130*di* and 130*dii* along with the hub halves 126*ci* and 126*cii* and 126*di* and 126*dii* may also be glued or otherwise fused together to complete the outer frame 110.

Figure 4:
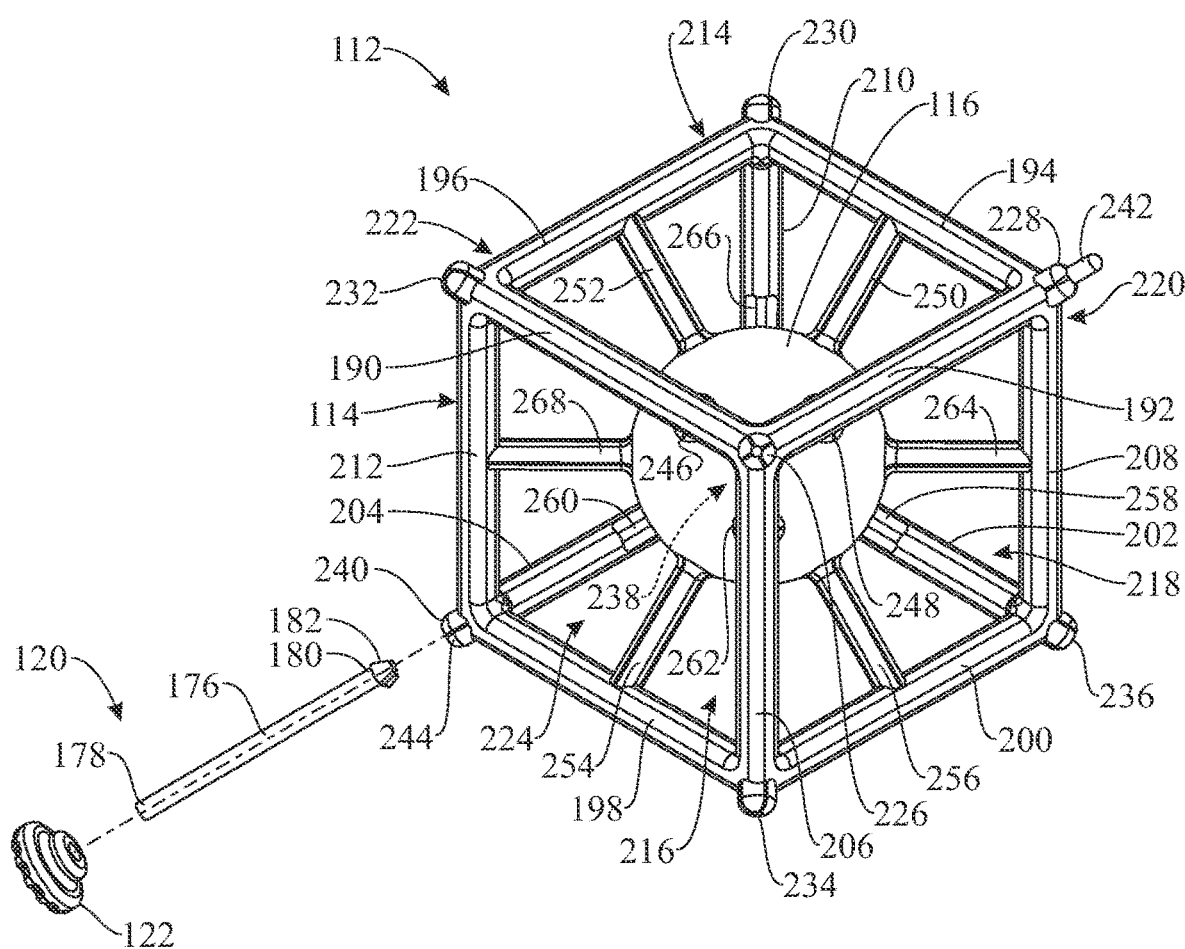
FIG. 4 presents an isometric view of the rotation mechanism and inner cubic frame assembly of the rotational device.

Referring now to FIGS. 3 and 4, the rotation mechanism 120 includes the rotatable knob 122 and a rotatable shaft 176 which is connected to the rotatable knob 122 and the cubic frame 114. Specifically, a first end 178 of the rotatable shaft 176 is connected to the rotatable knob 122 and a second end 180 of the rotatable shaft 176 is connected to the inner cubic frame assembly 112, such as to the cubic frame 114 of the inner cubic frame assembly 112.

As best shown in FIG. 4, the second end 180 of the rotatable shaft 176 is provided with an enlarged or conical head 182 which is configured to engage the cubic frame 114 in order to rotate the inner cubic frame assembly 112 in response to rotation of the rotatable knob 122. As discussed in more detail hereinbelow with regard to FIG. 6, the rotatable shaft 176 passes through and is supported by one of the intersections in the outer frame 110 and one of a series of inwardly directed arms associated with the fixed internal cubic frame 118.

With continued reference to the enlarged view of FIG. 4, the cubic frame 114 is formed from a series of legs 190, 192, 194 and 196; legs 198, 200, 202 and 204; and legs 206, 208, 210 and 212 which form the cubic shape of the cubic frame 114. The legs 190, 192, 194 and 196 define a top or first square 214 of the cubic frame 114. The legs 198, 200, 202 and 204 define a bottom or second square 216 of the cubic frame 114. The remaining side or third, fourth, fifth and sixth squares, 218, 220, 222 and 224, respectively, are defined by the disclosed legs as well. Specifically, the third square 218 is defined by the legs 192, 200, 206 and 208. The fourth square 220 is defined by the legs 194, 202, 208 and 210. The fifth square 222 is defined by the legs 196 204, 210 and 212. Finally, the sixth square 224 is defined by the legs 190, 198, 206 and 212. The first, second, third, fourth, fifth and sixth squares 214, 216, 218, 220, 222 and 224 define the cubic shape of the cubic frame 114.

At the intersections of the legs, the cubic frame 114 includes outwardly projecting reference points or nodes 226, 228, 230, 232, 234, 236, 238 and 240 which function to track or trace the movement of the cubic frame 114 as it is rotated within the outer frame 110. The node 226 extends outwardly from the intersection of legs 190, 192 and 206. The node 228 extends outwardly from the intersection of legs 192, 194 and 208. The node 230 extends outwardly from the intersection of legs 194, 196 and 210. The node 232 extends outwardly from the intersection of legs 190, 196 and 212. The node 234 extends outwardly from the intersection of legs 198, 200 and 206. The node 236 extends outwardly from the intersection of legs 200, 202 and 208. The node 238 (hidden behind the sphere 116) extends outwardly from the intersection of legs 202, 204 and 210. Finally, the node 240 extends outwardly from the intersection of legs 198, 204 and 212.

The inner cubic frame assembly 112 is rotatably supported within the outer frame 110 at two locations. The first is at the node 228 which includes a projecting pin 242 configured to engage an arm (described hereinbelow with regard to FIG. 6) of the fixed inner cubic frame 118 and the second is at a recess 244 in the node 240 which is configured to rotatably receive and support the conical head 182 on the second end 180 of the rotatable shaft 176.

As noted above, the inner sphere 116 is supported within the cubic frame 114. For instance, the inner sphere 116 may be supported or suspended within the cubic frame 114 by suspension arms 246, 248, 250 and 252 extending from legs 190, 192, 194 and 196, respectively. The inner sphere 116 may be further supported or suspended within the cubic frame 114 by suspension arms 254, 256, 258 and 260 extending from legs 198, 200, 202 and 204, respectively. Additionally, the inner sphere 116 may be supported or suspended within the cubic frame 114 by suspension arms 262, 264, 266 and 268 extending from legs 206, 208, 210 and 212, respectively. As shown, each suspension arm 246, 248, 250, 252, 254, 256, 258, 260, 262, 264, 266 and 268 may extend perpendicularly from the respective leg 190, 192, 194, 196, 198, 200, 202, 204, 206, 208, 210 and 212 and towards a center of the cubic frame 114 which coincides with the center of the inner sphere 116. In different embodiments of the invention, the disclosed suspension arms may be rigid or flexible to respectively prevent or enable inner sphere 116 to move relative to cubic frame 114 as well as to the outer frame 110 and the fixed internal frame 118.

The disclosed rotational device 100 and its components may be formed from a variety of materials such as, for example, metallic materials, polymeric materials, ceramic material, wood or wood based products, etc. The rotational device 100 may be formed by three-dimensional printing, molding, forming parts on a lathe, etc. More importantly, each of the components of the rotational device 100 including the outer frame 110, the cubic frame 114, the inner sphere 116 and the fixed internal cubic frame 118 may be formed with differing colors or textures to better enable a user to visualize and experience the relative motions of the components and the spaces therebetween relative to each other over time. All the disclosed support or suspension legs and arms along with the nodes may also be colored to easily identify movement and fixed points of reference. Furthermore, in different embodiments, the inner sphere 116 may be solid or hollow and may be formed from a variety of materials or include coatings to better enable its visibility as it moves within the outer frame 110.

Figure 5:
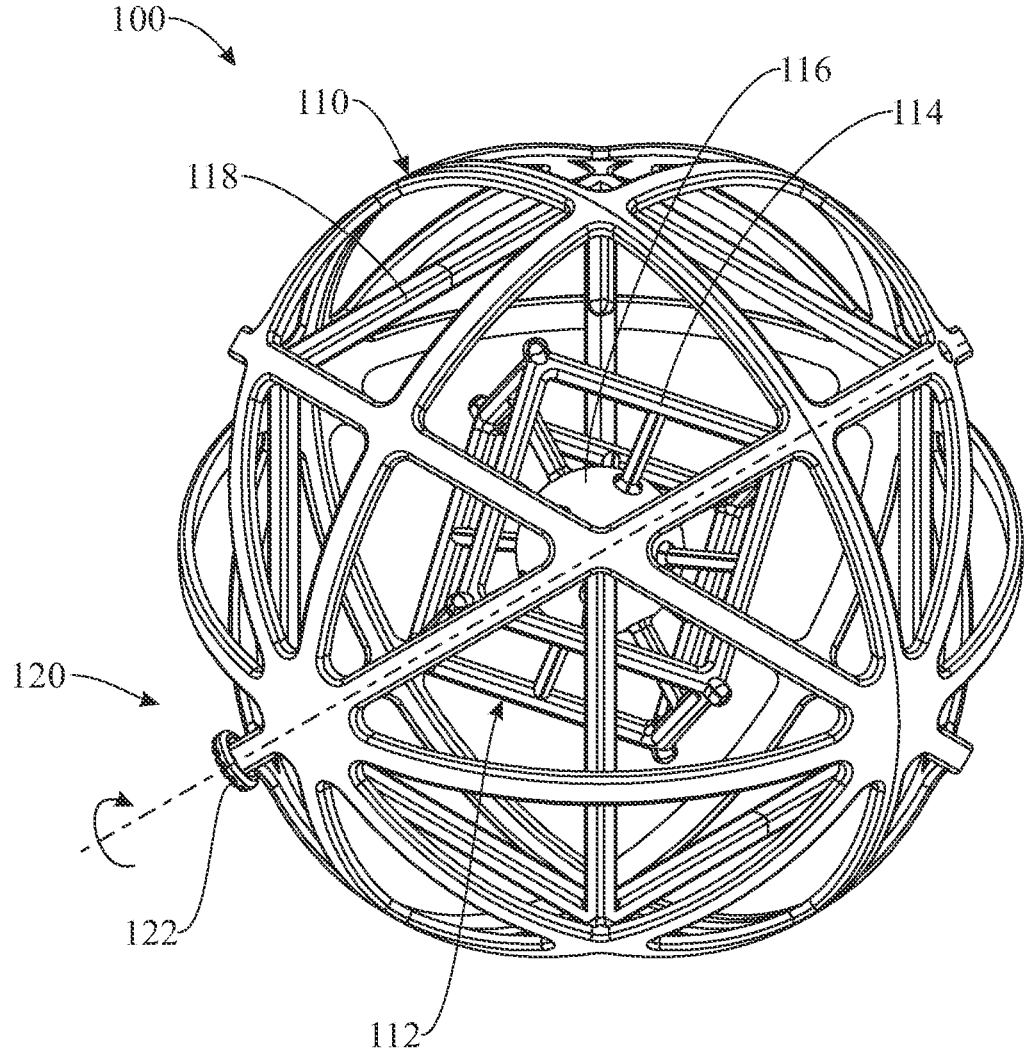
FIG. 5 presents a front view of the rotational device with the inner cubic frame assembly being rotated within the outer frame by the rotation mechanism.
Figure 6:
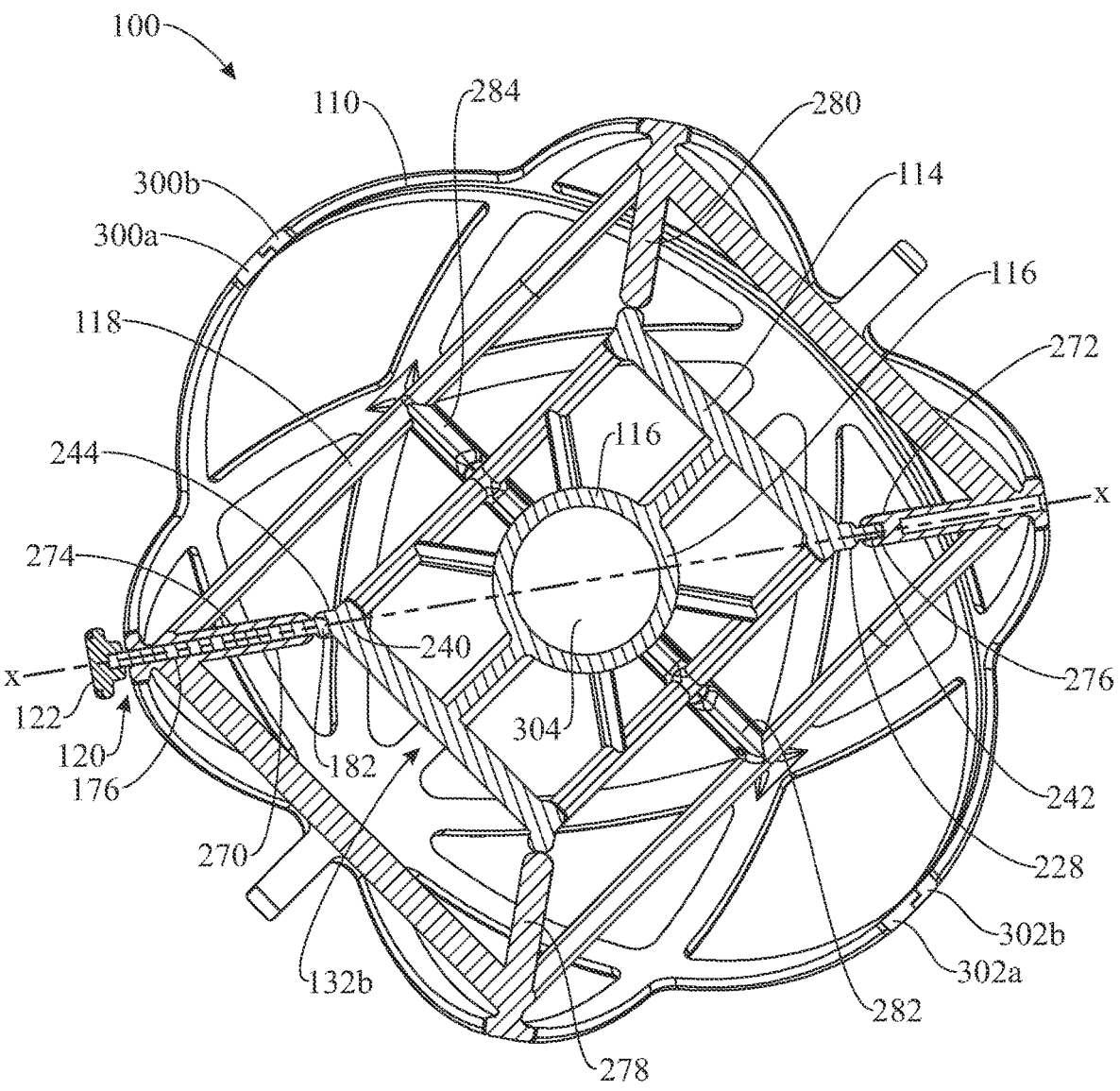
FIG. 6 presents a cross-sectional view of the rotational device, similar to FIG. 5 and illustrating points of support and rotational axis of the inner cubic frame assembly within the outer frame.

Turning now to FIGS. 5 and 6, the use of the rotational device 100 to enable a user to experience the movement of a three-dimensional object within four dimensions will now be described. Initially with regard to FIG. 5, the rotational device 100 is assembled as described hereinabove. The user can grasp the outer frame 110 or set it on a fixed surface such as, for example, a table, towel, pillow, etc. to keep it stationary and then rotate the inner cubic frame assembly 112 by turning the rotatable knob 122. Since the inner cubic frame assembly 112 is supported at two opposing corners or nodes 240 and 242 (FIGS. 4 and 6), the inner cubic frame assembly 112 turns within the outer frame 110 and the fixed internal cubic frame 118 along a rotation axis x-x (FIG. 6). The rotatable knob 122 may be continually turned to rotate the inner cubic frame assembly 112 over a period of time to enable a user to experience the movement of a three-dimensional object, i.e. the inner cubic frame assembly 112, within a fourth dimension i.e., time relative to a frame of reference fixed in time, i.e., the outer frame 110. The user can also see how the spaces or planes defined between the inner cubic frame assembly 112 and the outer frame 110 change over time as the device is operated.

Referring specifically to FIG. 6, the fixed internal cubic frame 118 includes inwardly directed support arms 270 and 272 for rotatably supporting the inner cubic frame assembly 112 within the outer frame 110. The rotatable shaft 176 of the rotation mechanism 120 extends through a bore 274 formed through support arm 270. As noted hereinabove, the conical head 182 of the rotatable shaft 176 is inserted into the recess 244 formed in the node 240 of the cubic frame 114 to rotatably support the inner cubic frame assembly 112. Likewise, the pin 242 extending from the node 228 of the cubic frame 114 is rotatably supported within a recess 276 formed in the support arm 272. Thus, the inner cubic frame assembly 112 is rotatably supported within the outer frame 110 and the fixed internal cubic frame 118.

It should be noted that the fixed internal cubic frame 118 includes additional inwardly directed reference arms which extend from the disclosed legs and intersections of legs of the fixed internal cubic frame 118 and which are spaced a minute distance from the nodes on the cubic frame 114. Some of these additional inwardly directed reference arms are shown in FIG. 6 as arms 278, 280, 282, etc. These additional reference arms provide additional reference points adjacent to which the nodes on the cubic frame 114 move relatively as the inner cubic frame assembly 112 is rotated to further enable a user to experience the motion of an object, a node, a space, a plane, etc. relative to a fixed object, such as, for example, the arm, over time. It should be noted that, while not specifically illustrated, there are preferably reference arms extending inwardly from each leg of the fixed internal cubic frame 118 as well as from each intersection of the legs of the fixed internal cubic frame 118. The reference arms are of a length that approaches the nodes without engaging the nodes or otherwise inhibiting the rotation of the inner cubic frame assembly 112 within the outer frame 110.

It should be noted that, in some embodiments, the inner sphere 116 may be hollow defining an internal cavity 304, as shown in FIG. 6. This lightens the weight of the inner sphere 116, and thus the inner cubic frame assembly 112 as a whole, to better enable the inner cubic frame assembly 112 to rotate freely within the outer frame 110.

Figure 7:
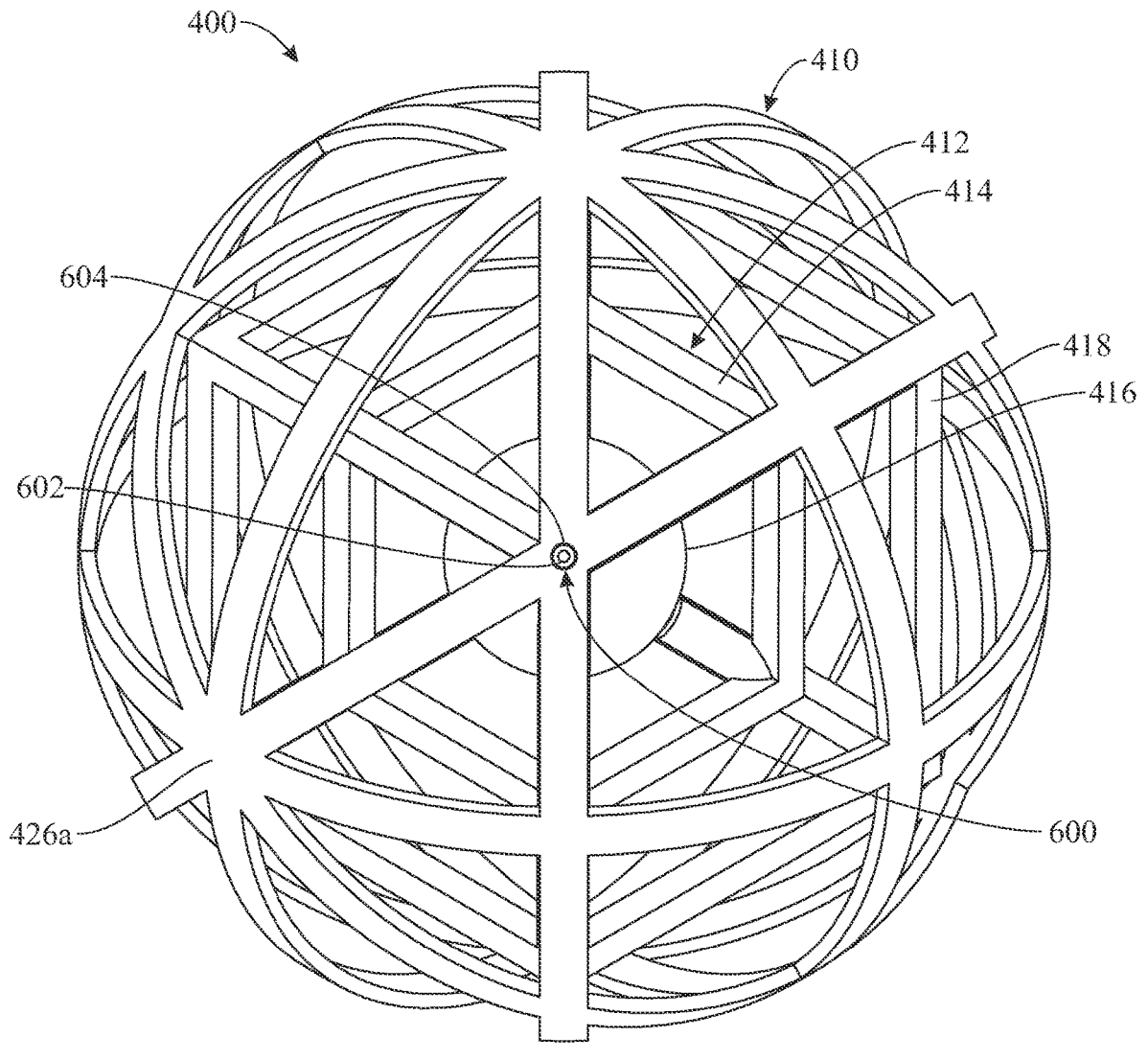
FIG. 7 presents a top, front isometric view of a rotational device in accordance with another embodiment of the present invention.
Figure 8:
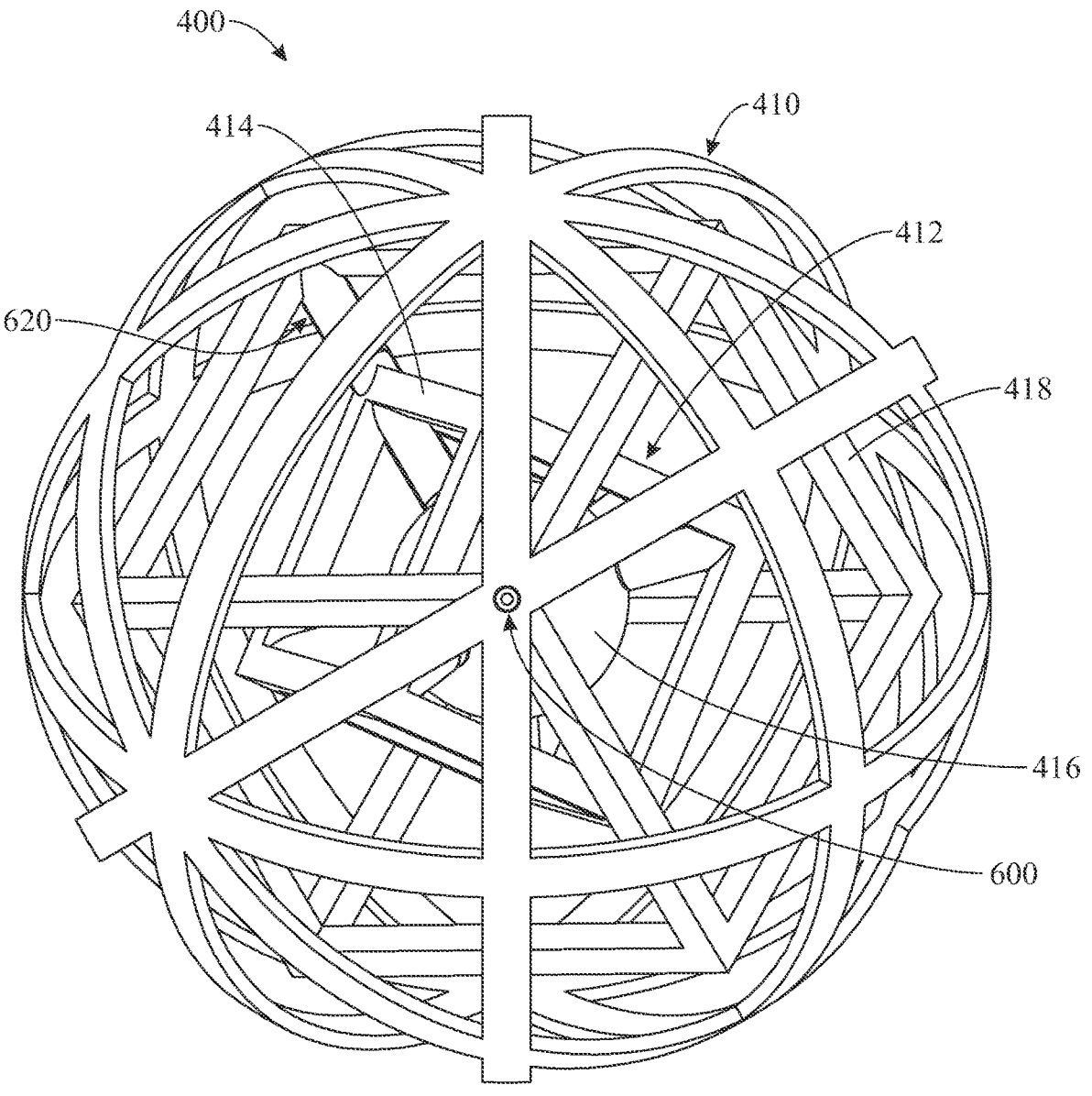
FIG. 8 presents a top, front isometric view of the rotational device of FIG. 7, with first and second internal cubic frames arranged in different rotational positions with respect to FIG. 7.

The illustrations of FIGS. 7-13 show a rotational device 400 in accordance with a further embodiment of the present invention. It should be noted that the rotational device 400 may include the same features as the rotational device 100 of the previous embodiment, unless expressly mentioned otherwise. With reference initially to FIGS. 7 and 8, similarly to the previous embodiment, the rotational device 400 of the present embodiment includes an outer frame 410, a first internal cubic frame 418 arranged inside and carried by the outer frame 410, and an inner cubic frame assembly 412 arranged inside and rotationally carried by the first internal cubic frame 418, the inner cubic frame assembly 412 including a second internal cubic frame 414 and an inner sphere 416. However, unlike the previous embodiment, the first internal cubic frame 418 is rotationally carried by the outer frame 410, and the inner sphere 416 is rotationally carried by the second internal cubic frame 414, as will be described in greater detail hereinafter. In other words, the rotational device 400 of the present embodiment includes four different elements which present an independent relative rotational movement with respect to each other: outer frame 410, first internal cubic frame 418, second internal cubic frame 414, and inner sphere 416. The outer frame 410 depicted herein is spherical; however, alternative shapes are contemplated without departing from the scope of the present disclosure.

In some embodiments, such as the present embodiment, the inner cubic frame assembly 412 may be visible through first internal cubic frame 418, and/or the first internal cubic frame 418 may be visible through the outer frame 410. In some embodiments, the outer frame 410, first internal cubic frame 418, second internal cubic frame 414, and inner sphere 416 may be visible from outside the outer frame 410. Further embodiments are contemplated in which the outer frame 410 may be entirely or partially covered or closed, entirely or partially concealing the first internal cubic frame 418, second internal cubic frame 414, and inner sphere 416.

Figure 9:
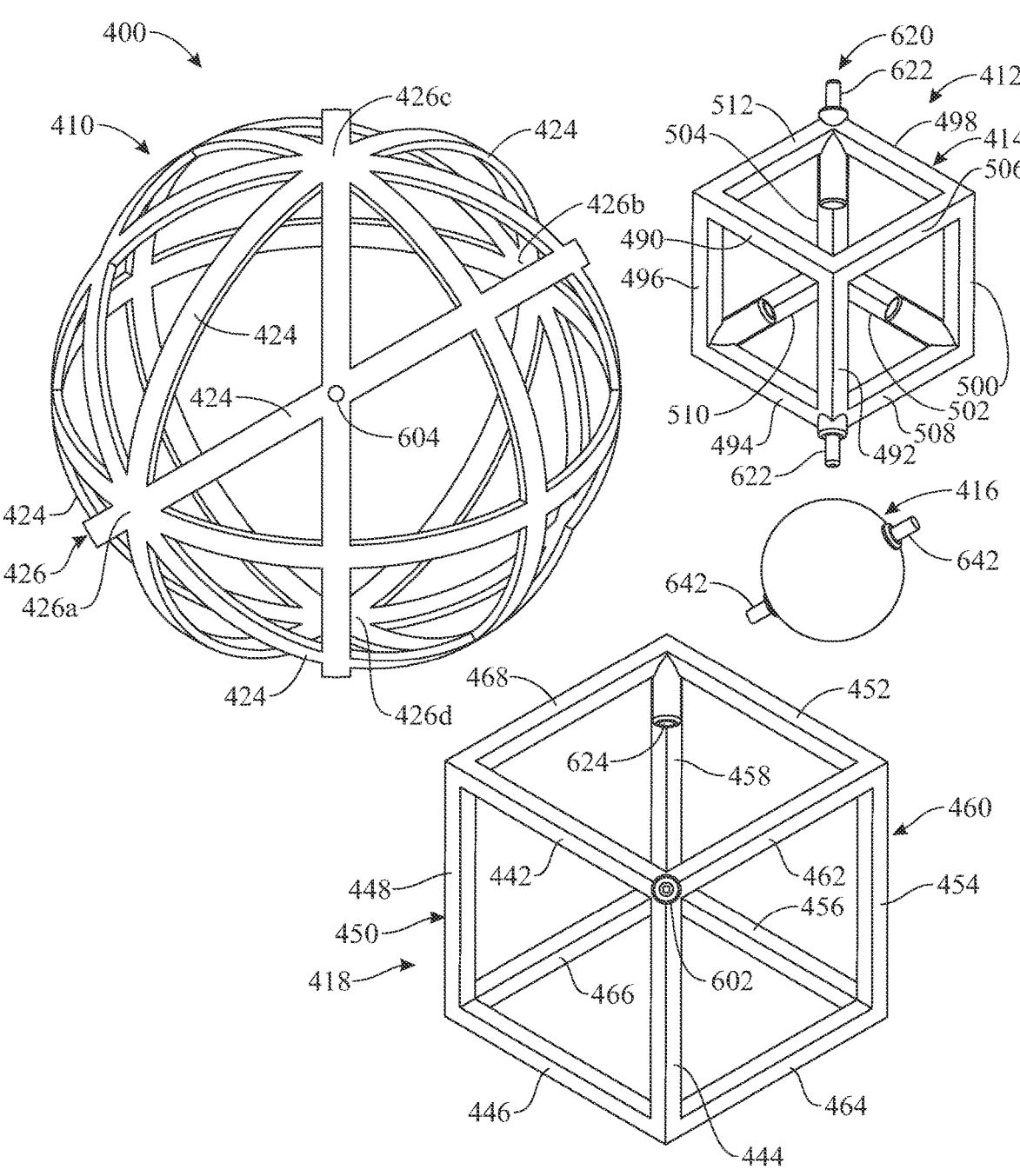
FIG. 9 presents an exploded, isometric view of the rotational device of FIG. 7.
Figure 10:
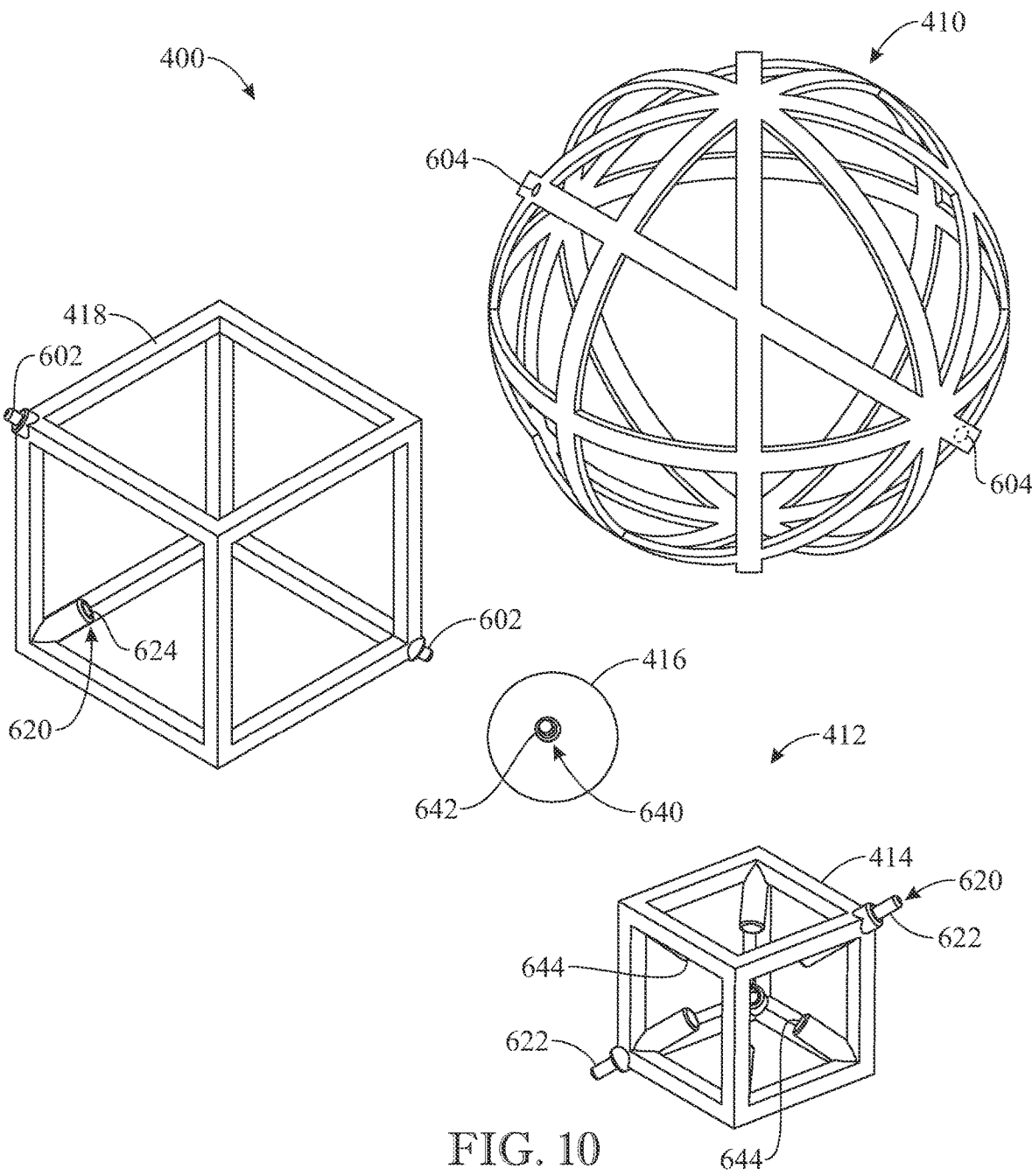
FIG. 10 presents another exploded, isometric view of the rotational device of FIG. 7, with parts viewed from respective, different angles with respect to FIG. 9.

As best shown in FIGS. 9 and 10, similarly to the previous embodiment, the outer frame 410 may be formed from a series of arms or wires 424 extending from and between a plurality of hubs 426. In the non-limiting example shown in the drawings, the plurality of hubs 426 is specifically comprised of four hubs 426a, 426b, 426c and 426d, where hubs 426a and 426b are located diametrically opposite each other, and hubs 426c and 426d are located diametrically opposite each other. Similarly to the previous embodiment, each wire of the plurality of wires 424 may extend between the hubs 426a, 426b, 426c and 426d, and/or between other wires of the plurality of wires 424. I.e., in some embodiments, the wires 424 may intersect with one another.

In some embodiments, spaces may be defined between the wires 424, allowing to see the first internal cubic frame 418, and optionally the second internal cubic frame 414, and further optionally the inner sphere 416, from outside the outer frame 410. In different embodiments, the number of spaces between wires 424 may vary from zero to any. In embodiments in which there are no spaces formed between the wires 424, i.e. said spaces are filled with one or more materials (e.g., a wall, net, etc.), the first internal cubic frame 418 and other components arranged inside the outer frame 410 may be at least partially concealed by said one or more materials.

As noted hereinabove, the rotational device 400 includes the first internal cubic frame 418 which is located within and fixedly attached to the outer frame 410. The first internal cubic frame 418 has four legs 442, 444, 446 and 448 which define (i.e. are arranged forming) a first square 450, four legs 452, 454, 456 and 458 which define (i.e. are arranged forming) a second square 460, and four legs 462, 464, 466, 468 extending parallel to one another interconnecting the first and second squares 450 and 460 at aligned corners thereof to form a cubic shape.

As further noted hereinabove, the rotational device 400 includes the inner cubic frame assembly 412, which includes the second internal cubic frame 414 and inner sphere 416. As shown in FIGS. 9 and 10, the second internal cubic frame 414 is formed from a series of legs 490, 492, 494 and 496; legs 498, 500, 502 and 504; and legs 506, 508, 510 and 512 which form the cubic shape of the second internal cubic frame 414.

Figure 11:
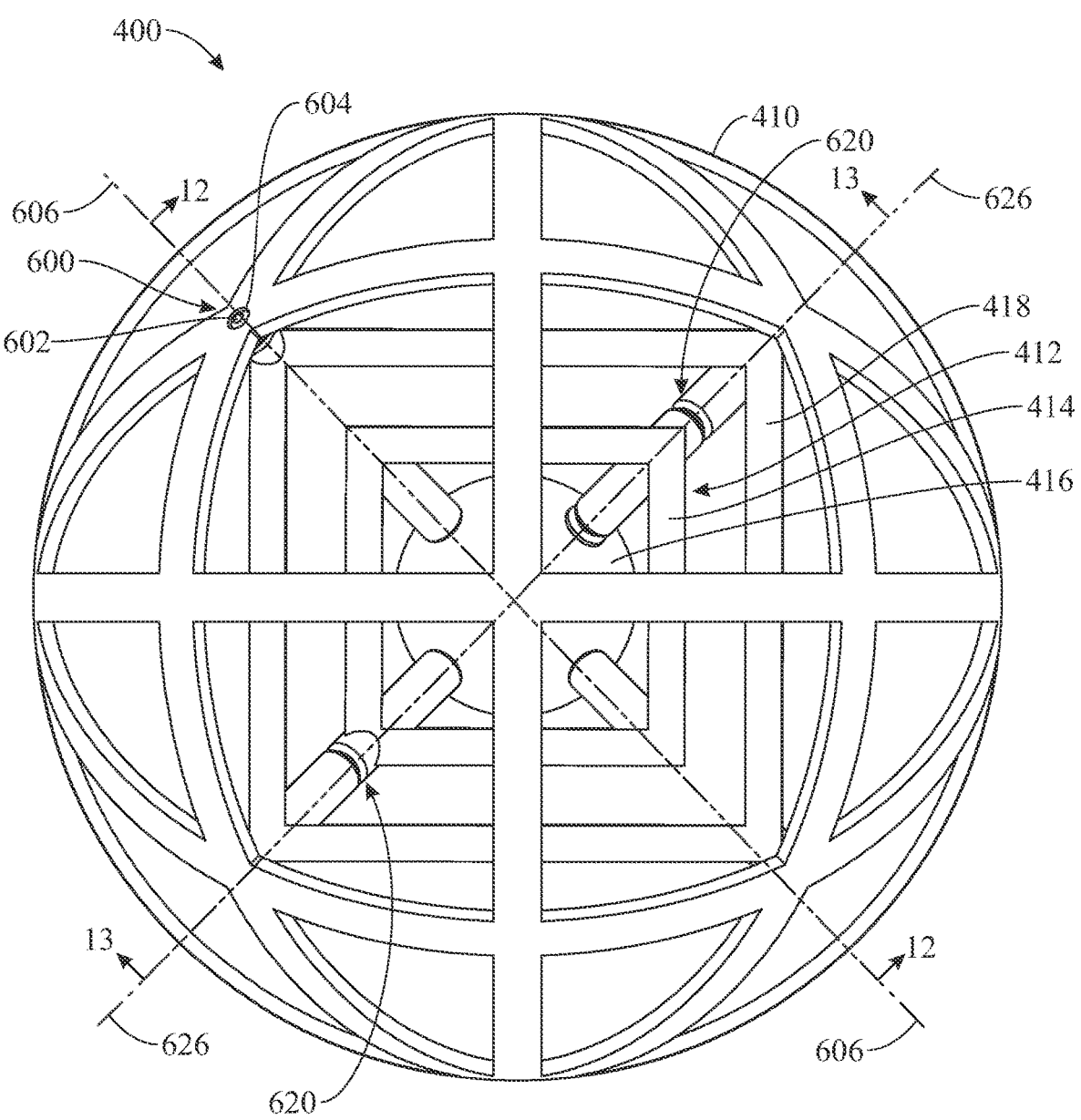
FIG. 11 presents a right side elevation view of the rotational device of FIG. 7.
Figure 12:
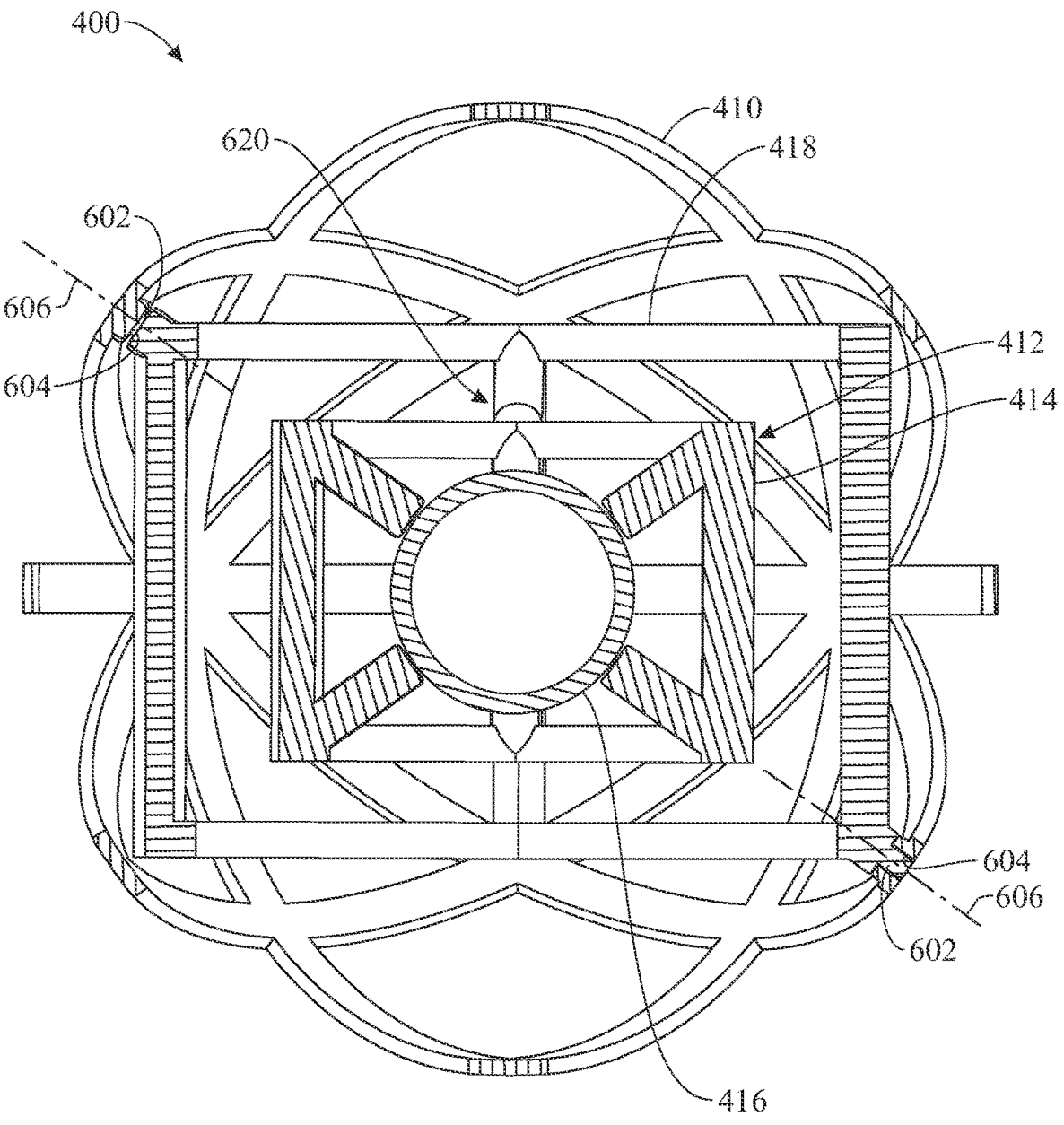
FIG. 12 presents a cross-sectional view of the rotational device of FIG. 11, the cross-section taken along section plane 12-12.

As shown for instance in FIGS. 10-12, the rotational device 400 may include a first rotation mechanism 600 rotatably connecting the first internal cubic frame 418 and the outer frame 410 to one another. In some embodiments, the first rotation mechanism 600 may include a pair of pins 602 and a corresponding pair of openings 604, where each opening 604 rotatably receives a respective pin 602 of the pair of pins 602, the pairs of pins 602 and openings 604 thereby defining a first rotation axis 606. In some embodiments, at least one of the pins 602 may be comprised in the first internal cubic frame 418, and corresponding one or more openings 604 may be comprised in the outer frame 410. For example, as best shown in FIG. 10, the first internal cubic frame 418 of the present embodiment includes a pair of diametrically-opposed pins 602, and the outer frame 410 includes a pair of diametrically-opposed openings 604 configured to rotatably receive the pins 602 of the first internal cubic frame 418 and thereby enable the first internal cubic frame 418 for rotation relative to the outer frame 410 about the first rotation axis 606. Alternative embodiments are contemplated in which the outer frame 410 may include one or more of the pins 602, and the first internal cubic frame 418 may include one or more of the openings 604, for rotatably receiving the one or more pins 602 of the outer frame 410. In some embodiments, the first rotation mechanism 600 may be externally operable for rotation, such as by a knob, as described heretofore with reference to the previous embodiment, or other torque-applying mechanism such as, but not limited to, a motor.

As shown for instance in FIGS. 9-11 and 13, the rotational device 400 may include a second rotation mechanism 620 rotatably connecting the second internal cubic frame 414 of the inner cubic frame assembly 412 and the first internal cubic frame 418 to one another. In some embodiments, the second rotation mechanism 620 may include a pair of pins 622 and a corresponding pair of openings 624, where each opening 624 rotatably receives a respective pin 622 of the pair of pins 622, the pairs of pins 622 and openings 624 thereby defining a second rotation axis 626. In some embodiments, at least one of the pins 622 may be comprised in the second internal cubic frame 414 of the inner cubic frame assembly 412, and corresponding one or more openings 624 may be comprised in the first internal cubic frame 418. For example, the second internal cubic frame 414 of the inner cubic frame assembly 412 of the present embodiment includes a pair of diametrically-opposed pins 622, and the first internal cubic frame 418 includes a pair of diametrically-opposed openings 624 configured to rotatably receive the pins 622 of the first internal cubic frame 418 and thereby enable the second internal cubic frame 414 of the inner cubic frame assembly 412 for rotation relative to the first internal cubic frame 418 about the second rotation axis 626. Alternative embodiments are contemplated in which the first internal cubic frame 418 may include one or more of the pins 622, and the second internal cubic frame 414 of the inner cubic frame assembly 412 may include one or more of the openings 624, for rotatably receiving the one or more pins 622 of the first internal cubic frame 418. In some embodiments, the second rotation mechanism 620 may be externally operable for rotation, such as by a knob, as described heretofore with reference to the previous embodiment, or other torque-applying mechanism such as, but not limited to, a motor.

Figure 13:
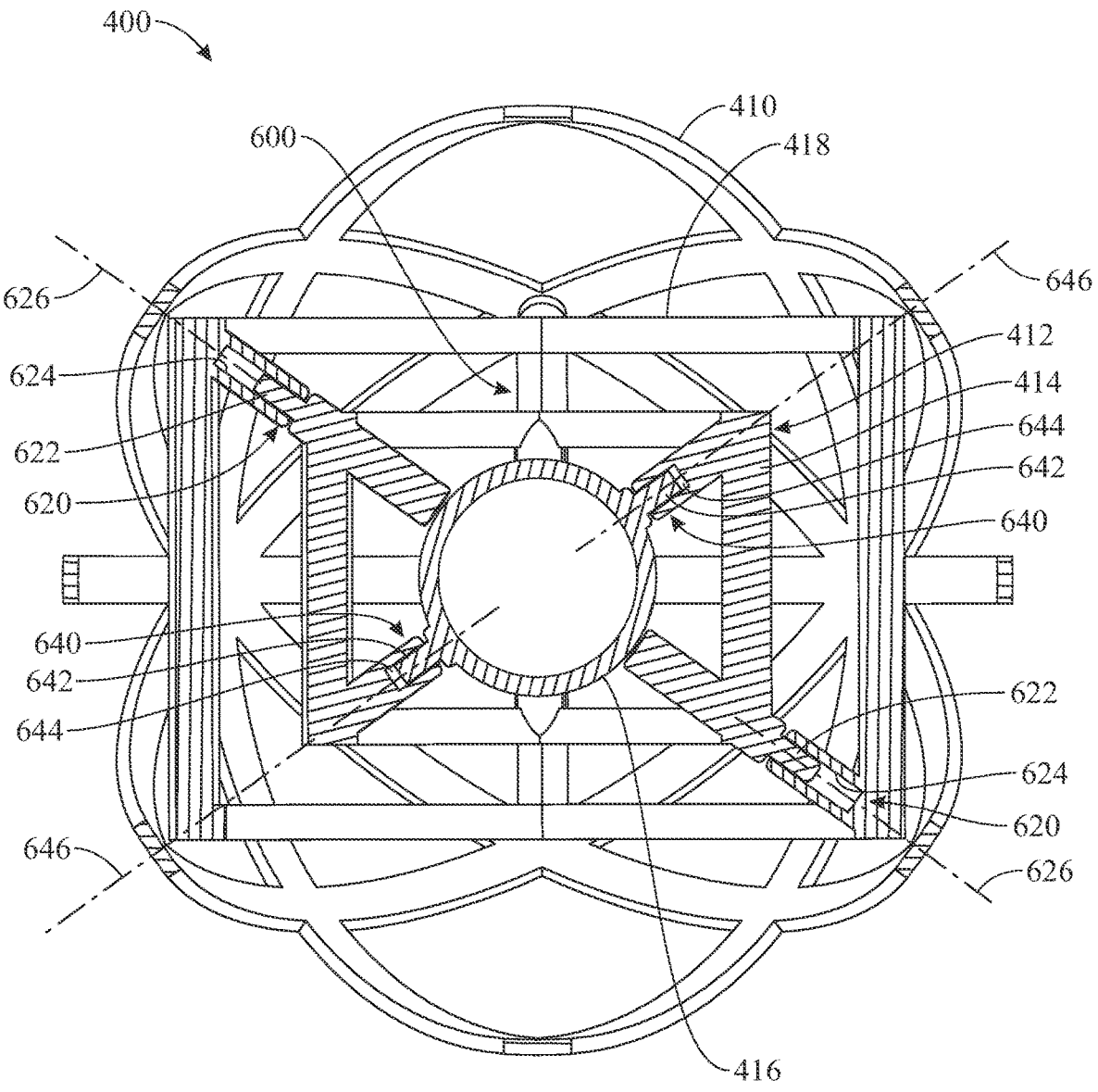
FIG. 13 presents a cross-sectional view of the rotational device of FIG. 11, the cross-section taken along section plane 13-13.

With continued reference to FIGS. 9-11 and 13, the rotational device 400 of the present embodiment may include a third rotation mechanism 640 rotatably connecting the second internal cubic frame 414 and inner sphere 416 of the inner cubic frame assembly 412 to one another. In some embodiments, the third rotation mechanism 640 may include a pair of pins 642 and a corresponding pair of openings 644, where each opening 644 rotatably receives a respective pin 642 of the pair of pins 642, the pairs of pins 642 and openings 644 thereby defining a third rotation axis 646. In some embodiments, at least one of the pins 642 may be comprised in the inner sphere 416, and corresponding one or more openings 644 may be comprised in the first internal cubic frame 418. For example, as best shown in FIGS. 9, 10 and 13, the inner sphere 416 of the present embodiment includes a pair of diametrically-opposed pins 642, and the first internal cubic frame 418 includes a pair of diametrically-opposed openings 644 configured to rotatably receive the pins 642 of the inner sphere 416 and thereby enable the inner sphere 416 for rotation relative to the first internal cubic frame 418 about the third rotation axis 646. Alternative embodiments are contemplated in which the first internal cubic frame 418 may include one or more of the pins 642, and the inner sphere 416 may include one or more of the openings 644, for rotatably receiving the one or more pins 642 of the first internal cubic frame 418. In some embodiments, the third rotation mechanism 640 may be externally operable for rotation, such as by a knob, as described heretofore with reference to the previous embodiment, or other torque-applying mechanism such as, but not limited to, a motor.

In preferred embodiments, such as the present embodiment, the first, second and third rotation axes 606, 626 and 646 are arranged in different directions with respect to each other. Such different arrangement of all rotation axes may enhance the visual effects provided by the rotational device 400. However, alternative embodiments are contemplated without departing from the scope of the present disclosure.

The disclosed rotational device 400 and its components may be formed from a variety of materials such as, for example, metallic materials, polymeric materials, ceramic material, wood or wood based products, etc. The rotational device 400 may be formed by three-dimensional printing, molding, forming parts on a lathe, etc. More importantly, each of the components of the rotational device 400 including the outer frame 410, the second internal cubic frame 414, the inner sphere 416, and the first internal cubic frame 418 may be formed with differing colors or textures to better enable a user to visualize and experience the relative motions of the components and the spaces therebetween relative to each other over time. All the disclosed support or suspension legs and arms along with the nodes may also be colored to easily identify movement and fixed points of reference. Furthermore, in different embodiments, the inner sphere 416 may be solid or hollow and may be formed from a variety of materials or include coatings to better enable its visibility as it moves within the outer frame 410.

In summary, the disclosed rotational device 100, 400 provides a tangible device to enable a user to physically experience and observe the movement of a three-dimensional object in four dimensions.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A rotational device, comprising:
an outer frame;
a first internal cubic frame, attached to the outer frame and arranged within an interior of the outer frame;
a second internal cubic frame, rotatably attached to the first internal cubic frame and arranged within an interior of the first internal cubic frame; and an inner sphere, attached to the second internal cubic frame and arranged within an interior of the second internal cubic frame.

2. The rotational device of claim 1, wherein the first internal cubic frame is visible from outside the outer frame through the outer frame.

3. The rotational device of claim 2, wherein the second internal cubic frame is visible from outside the outer frame through the first internal cubic frame and outer frame.

4. The rotational device of claim 3, wherein the inner sphere is visible from outside the outer frame through the second internal cubic frame, first internal cubic frame and outer frame.

5. The rotational device of claim 1, wherein the outer frame comprises a plurality of wires forming a three-dimensional structure defining the interior of the outer frame.

6. The rotational device of claim 5, wherein an outer side of the outer frame defined by outer sides of the plurality of wires is shaped as a sphere.

7. The rotational device of claim 5, wherein the interior of the outer frame, the first and second internal cubic frames, and the inner sphere are visible from outside the outer frame and between the plurality of wires.

8. The rotational device of claim 7, wherein the first and second internal cubic frames, and the inner sphere are visible from outside the outer frame through spaces defined between the plurality of wires.

9. The rotational device of claim 1, wherein the first internal cubic frame is rigidly and non-movably connected to the outer frame.

10. The rotational device of claim 1, wherein the first internal cubic frame is mounted to the outer frame such that the first internal cubic frame is rotatable relative to the outer frame.

11. The rotational device of claim 10, wherein the first internal cubic frame is rotatably supported by two points of the outer frame, the two points defining a rotation axis of the first internal cubic frame with respect to the outer frame.

12. The rotational device of claim 11, wherein the first internal cubic frame is rotatably coupled to, and carried by, the outer frame at the two points.

13. The rotational device of claim 1, wherein the second internal cubic frame is rotatably supported by two points of the first internal cubic frame, the two points defining a rotation axis of the second internal cubic frame with respect to the first internal cubic frame.

14. The rotational device of claim 13, wherein the second internal cubic frame is rotatably coupled to, and carried by, the first internal cubic frame at the two points.

15. The rotational device of claim 1, wherein the inner sphere is rigidly and non-movably connected to the second internal cubic frame.

16. The rotational device of claim 1, wherein the sphere is mounted to the second internal cubic frame such that the sphere is rotatable relative to the second internal cubic frame.

17. The rotational device of claim 16, wherein the inner sphere is rotatably supported by two points of the second internal cubic frame, the two points defining a rotation axis of the inner sphere with respect to the second internal cubic frame.

18. The rotational device of claim 17, wherein the inner sphere is rotatably coupled to, and carried by, the second internal cubic frame at the two points.

19. A rotational device, comprising:
an outer frame;

a first internal cubic frame, rotatably attached to the outer frame and arranged within an interior of the outer frame, the first internal cubic frame visible from outside the outer frame through the outer frame, the first internal cubic frame rotatable with respect to the outer frame about a first rotation axis;

a second internal cubic frame, rotatably attached to the first internal cubic frame and arranged within an interior of the first internal cubic frame, the second internal cubic frame visible from outside the outer frame through the first internal cubic frame and outer frame, the second internal cubic frame rotatable with respect to the first internal cubic frame about a second rotation axis; and an inner sphere, attached to the second internal cubic frame and arranged within an interior of the second internal cubic frame, the inner sphere visible from outside the outer frame through the second internal cubic frame, first internal cubic frame and outer frame, the inner sphere rotatable with respect to the second internal cubic frame about a third rotation axis; wherein the first, second and third rotation axes are arranged in different directions.

20. A rotational device, comprising:

an outer frame, comprising a plurality of wires forming a three-dimensional structure defining an interior of the outer frame;

a first internal cubic frame, rotatably attached to the outer frame and arranged within the interior of the outer frame, the first internal cubic frame visible from outside the outer frame through the outer frame, the first internal cubic frame rotatable with respect to the outer frame about a first rotation axis;

a second internal cubic frame, rotatably attached to the first internal cubic frame and arranged within an interior of the first internal cubic frame, the second internal cubic frame visible from outside the outer frame through the first internal cubic frame and outer frame, the second internal cubic frame rotatable with respect to the first internal cubic frame about a second rotation axis; and an inner sphere, attached to the second internal cubic frame and arranged within an interior of the second internal cubic frame, the inner sphere visible from outside the outer frame through the second internal cubic frame, first internal cubic frame and outer frame, the inner sphere rotatable with respect to the second internal cubic frame about a third rotation axis; wherein the first, second and third rotation axes are arranged in different directions.

* * * * *